United States Patent
Unton

(10) Patent No.: US 12,084,977 B1
(45) Date of Patent: Sep. 10, 2024

(54) GAS TURBINE ENGINE WITH FAN TRACK LINER HAVING TRIPLY PERIODIC MINIMAL SURFACE REINFORCEMENT

(71) Applicant: Rolls-Royce North American Technologies Inc., Indianapolis, IN (US)

(72) Inventor: Timothy Unton, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/484,062

(22) Filed: Oct. 10, 2023

(51) Int. Cl.
| | |
|---|---|
| F01D 11/12 | (2006.01) |
| F01D 21/04 | (2006.01) |
| F01D 25/24 | (2006.01) |
| F01D 25/28 | (2006.01) |
| F04D 29/52 | (2006.01) |

(52) U.S. Cl.
CPC .......... *F01D 11/122* (2013.01); *F01D 11/127* (2013.01); *F01D 21/045* (2013.01); *F01D 25/24* (2013.01); *F01D 25/28* (2013.01); *F04D 29/526* (2013.01); *F05D 2220/36* (2013.01); *F05D 2260/31* (2013.01); *F05D 2300/522* (2013.01); *F05D 2300/603* (2013.01); *F05D 2300/6031* (2013.01); *F05D 2300/6034* (2013.01)

(58) Field of Classification Search
CPC ...... F01D 11/12; F01D 11/122; F01D 11/125; F01D 11/127; F01D 21/045; F05D 2240/14; F05D 2300/603; F05D 2300/6034; F05D 2300/6031; F05D 2220/36; F05D 2300/522; F04D 29/526
See application file for complete search history.

(56) References Cited

U.S. PATENT DOCUMENTS

| | | | |
|---|---|---|---|
| 5,259,724 A * | 11/1993 | Liston | F01D 21/045 415/119 |
| 5,344,280 A * | 9/1994 | Langenbrunner | F01D 21/045 428/116 |
| 7,510,052 B2 | 3/2009 | Ayle | |
| 7,914,251 B2 | 3/2011 | Pool et al. | |
| 8,028,802 B2 | 10/2011 | Durchholz et al. | |
| 8,186,934 B2 | 5/2012 | Humphries | |
| 8,591,172 B2 | 11/2013 | Bottome | |

(Continued)

FOREIGN PATENT DOCUMENTS

WO       2023041402       3/2023

OTHER PUBLICATIONS

Oraib Al-Ketan et al., MSLattice: A free software for generating uniform and graded lattices based on triply periodic minimal surfaces, Material Design & Processing Communications, https://doi.org/10.1002/mdp2.205 , received Aug. 21, 2020.

(Continued)

*Primary Examiner* — Christopher Verdier
(74) *Attorney, Agent, or Firm* — Barnes & Thornburg LLP

(57) ABSTRACT

A fan case assembly adapted for use with a gas turbine engine includes a fan case and a fan track liner. The fan case that extends circumferentially about an axis. The fan track liner extends circumferentially at least partway about the axis and is coupled with the fan case. The fan track liner includes an abradable section and a core section located radially outward of the abradable section. The core section defines a triply periodic minimal surface geometry.

19 Claims, 7 Drawing Sheets

(56) References Cited

U.S. PATENT DOCUMENTS

| | | | |
|---|---|---|---|
| 9,683,490 B2 | 6/2017 | Harper et al. | |
| 9,702,375 B2 | 7/2017 | Costa et al. | |
| 9,803,497 B2 | 10/2017 | Le Biez et al. | |
| 10,260,522 B2 | 4/2019 | Heeter et al. | |
| 10,982,553 B2 | 4/2021 | Rathay et al. | |
| 11,118,511 B2 | 9/2021 | Finlayson et al. | |
| 11,448,090 B2 | 9/2022 | Pelin | |
| 11,591,927 B1 | 2/2023 | Hall et al. | |
| 11,674,405 B2 | 6/2023 | Johnson et al. | |
| 2009/0277153 A1 | 11/2009 | Harper et al. | |
| 2015/0267556 A1* | 9/2015 | Thomas | F01D 21/045 415/119 |
| 2015/0292407 A1 | 10/2015 | Riou et al. | |
| 2015/0354408 A1* | 12/2015 | Snyder | F01D 21/045 415/196 |
| 2016/0069214 A1* | 3/2016 | Engebretsen | F01D 21/045 415/196 |
| 2017/0198715 A1* | 7/2017 | Engebretsen | F04D 29/526 |
| 2021/0294943 A1 | 9/2021 | Kang et al. | |
| 2021/0324759 A1* | 10/2021 | Pelin | B29C 70/323 |
| 2023/0193827 A1 | 6/2023 | Heeter et al. | |

OTHER PUBLICATIONS

Kirttayoth Yeranee et al., Triply Periodic Minimal Surfaces Thermal Hydraulic Effects, https://encyclopedia.pub/entry/39188.

\* cited by examiner

GAS TURBINE ENGINE WITH FAN TRACK LINER HAVING TRIPLY PERIODIC MINIMAL SURFACE REINFORCEMENT

FIELD OF THE DISCLOSURE

The present disclosure relates generally to gas turbine engines, and more specifically to fan track liners for gas turbine engines.

BACKGROUND

Gas turbine engines used in aircraft often include a fan assembly that is driven by an engine core to push air through the engine and provide thrust for the aircraft. A typical fan assembly includes a fan rotor having blades and a fan case that extends around the blades of the fan rotor. During operation, the fan blades of the fan rotor are rotated to push air through the engine. The fan case both guides the air pushed by the fan blades and provides a protective band that blocks fan blades from escaping out of the fan assembly in case of a blade-off event in which a fan blade is released from the fan rotor.

Fan cases sometimes include metallic shrouds and liners positioned between the metallic shroud and the fan blades. Liners may be coupled to metallic shrouds by hanger features that extend from the metallic shrouds, by adhesives that provide a permanent bond to the metallic shrouds, or by fasteners/through bolts bolted directly to the case. Fan cases may also provide containment functions in case of a blade-off event. The containment function of the fan cases may make it difficult to incorporate other features into the fan case, while still maintaining the structural integrity of the fan case system.

SUMMARY

The present disclosure may comprise one or more of the following features and combinations thereof.

A fan case assembly adapted for use with a gas turbine engine may include a fan track liner and an annular case. The fan track liner may extend circumferentially at least partway about a central axis of the gas turbine engine and axially between a forward end and an aft end spaced apart axially from the forward end. The annular case may be configured to support the fan track liner at a radial position relative to the central axis.

In some embodiments, the fan track liner may include an abradable section comprising an abradable material that extends between the forward end and the aft end to define a gas path of the gas turbine engine, a septum section that comprises a composite material, and a core section. The septum section may be bonded to the abradable section radially outward of the abradable section. The core section may be bonded to the septum section and configured to dissipate energy of a fan blade during a blade off event.

In some embodiments, the annular case may include an outer wall and a hook. The outer wall may extend circumferentially around the central axis of the gas turbine engine. The hook may extend radially inward and axially aft from the outer wall. The hook may be coupled with the fan track liner to support the forward end of the fan track liner.

In some embodiments, the core section of the fan track liner may comprise a triply periodic minimal surface geometry. The triply periodic minimal surface geometry may have a variable density that increases in at least one of a radially outward direction and an axially aft direction. The density of the triply periodic minimal surface geometry may increase in one of the radially outward direction and the axially aft direction so that the initial impact of the fan blade with the fan track liner during the blade off event allows the fan blade to move into the fan track liner with relatively low resistance while the fan track liner provides relative high resistance as the fan blade moves radially outward to provide additional energy absorption to capture the fan blade in the fan track liner after the initial impact.

In some embodiments, the density of the triply periodic minimal surface geometry may increase in both the radially outward direction and the axially aft direction. In some embodiments, the density of the triply periodic minimal surface geometry may increase in only one of the radially outward direction and the axially aft direction.

In some embodiments, the fan case assembly may further include a plurality of fasteners. The plurality of fasteners may extend through the fan track liner into the annular case to couple the fan track liner to the annular case. The core section of the fan track liner may include solid geometry arranged around each of the plurality of fasteners.

In some embodiments, the triply periodic minimal surface may be one of a diamond, neovius, primitive, and gyroid triply periodic minimal surface. In some embodiments, the triply periodic minimal surface may be a diamond triply periodic minimal surface. In some embodiments, the triply periodic minimal surface may be a neovius triply periodic minimal surface. In some embodiments, the triply periodic minimal surface may be a primitive triply periodic minimal surface. In some embodiments, the triply periodic minimal surface may be a gyroid triply periodic minimal surface.

In some embodiments, the fan case assembly may further include a plurality of fasteners. The plurality of fasteners may extend through the fan track liner into the annular case to couple the fan track liner to the annular case. The density of the triply periodic minimal surface geometry may be greater at a first distance around each of the plurality of fasteners and lesser at a second distance around each of the plurality of fasteners. The second distance may be greater than the first distance.

In some embodiments, the fan track liner may further include through holes. The through holes may extend through the fan track liner. Each fastener of the plurality of fasteners may extend through one of the through holes and into the annular case. The core section of the fan track liner may have a solid geometry around the plurality of fasteners.

In some embodiments, the annular case may further include an intermediate hook that extends radially inward from the outer wall. Each fastener of the plurality of fasteners may extend through one of the through holes and into the intermediate hook of the annular case.

In some embodiments, the core section of the fan track liner may define a plurality of unit cells that each include the triply periodic minimal surface geometry. The density of the plurality of unit cells may increase moving in one of the radially outward direction and the axially aft direction.

According to another aspect of the present disclosure, a fan case assembly adapted for use with a gas turbine engine may include a fan case and a fan track liner. The fan case may extend circumferentially about an axis. The fan track liner may extend circumferentially at least partway about the axis and may be coupled with the fan case.

In some embodiments, the fan track liner including an abradable section and a core section located radially outward of the abradable section. The core section may define a triply periodic minimal surface geometry.

In some embodiments, the triply periodic minimal surface geometry may have a variable density that increases in at least one of a radially outward direction and an axially aft direction. In some embodiments, the density of the triply periodic minimal surface geometry increases in both the radially outward direction and the axially aft direction.

In some embodiments, the fan case assembly further includes a plurality of fasteners. The plurality of fasteners may extend through the fan track liner into the fan case to couple the fan track liner to the fan case. The core section of the fan track liner may include solid geometry arranged around each of the plurality of fasteners.

In some embodiments, the triply periodic minimal surface may be one of a diamond, neovius, primitive, and gyroid triply periodic minimal surface. In some embodiments, the triply periodic minimal surface may be a diamond triply periodic minimal surface. In some embodiments, the triply periodic minimal surface may be a neovius triply periodic minimal surface. In some embodiments, the triply periodic minimal surface may be a primitive triply periodic minimal surface. In some embodiments, the triply periodic minimal surface may be a gyroid triply periodic minimal surface.

In some embodiments, the fan case assembly may include a plurality of fasteners. The plurality of fastener extend through the fan track liner into the fan case to couple the fan track liner to the fan case. The density of the triply periodic minimal surface geometry may be greater at a first distance around each of the plurality of fasteners and lesser at a second distance around each of the plurality of fasteners, the second distance being greater than the first distance.

In some embodiments, the fan track liner may further include through holes that extend through the fan track liner. Each fastener of the plurality of fasteners may extend through one of the through holes and into the fan case. The core section of the fan track liner may have a solid geometry around the plurality of fasteners.

In some embodiments, the fan case may include an outer wall that extends circumferentially around the central axis of the gas turbine engine, a forward hook that extends radially inward and axially aft from the outer wall, and an intermediate hook. The intermediate hook may extend radially inward from the outer wall. Each fastener of the plurality of fasteners may extend through one of the through holes and into the intermediate hook of the fan case.

In some embodiments, the fan track liner may define a plurality of unit cells that each include the triply periodic minimal surface geometry. The density of the plurality of unit cells may increases moving in one of the radially outward direction and the axially aft direction.

According to another aspect of the present disclosure, a method may include forming a core section to define a triply periodic minimal surface geometry. The triply periodic minimal surface may have a variable density that increases in at least one of a radially outward direction and an axially aft direction. The core section may extend circumferentially at least partway about an axis and axially between a forward end and an aft end spaced apart axially from the forward end.

In some embodiments, the method may further include adding an abradable section on the core section radially inward of the core section to form the fan track liner. The abradable section may comprise an abradable material.

In some embodiments, the method may further include coupling the fan track liner to an annular case that extends circumferentially at least partway about the axis. Coupling the fan track liner to the annular case may include inserting a plurality of fasteners through the fan track liner into the annular case.

In some embodiments, the density of the triply periodic minimal surface geometry may be greater at a first distance around each of the plurality of fasteners and lesser at a second distance around each of the plurality of fasteners. The second distance may be greater than the first distance.

These and other features of the present disclosure will become more apparent from the following description of the illustrative embodiments.

DETAILED DESCRIPTION OF THE DRAWINGS

Figure 1:
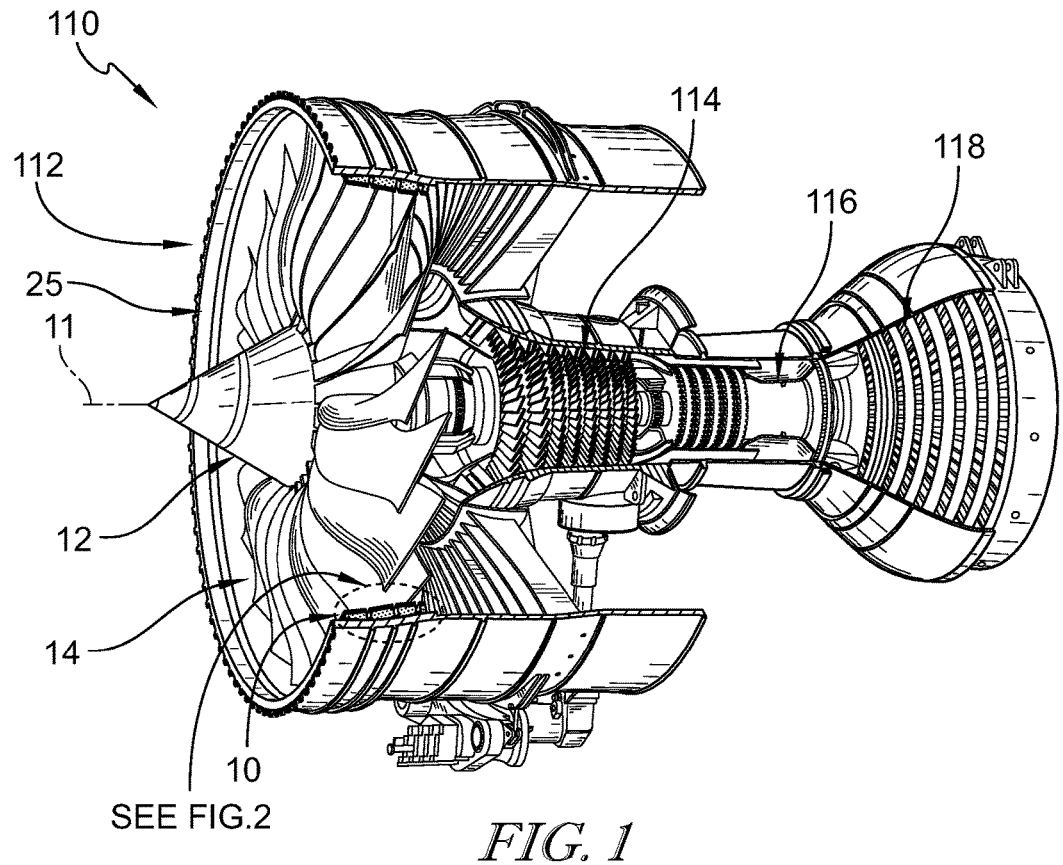
FIG. 1 is a cutaway view of a gas turbine engine that includes a fan, a compressor, a combustor, and a turbine, the fan including a fan rotor configured to rotate about an axis of the engine and a fan case assembly that surrounds fan blades included in the fan rotor.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112.

Figure 2:
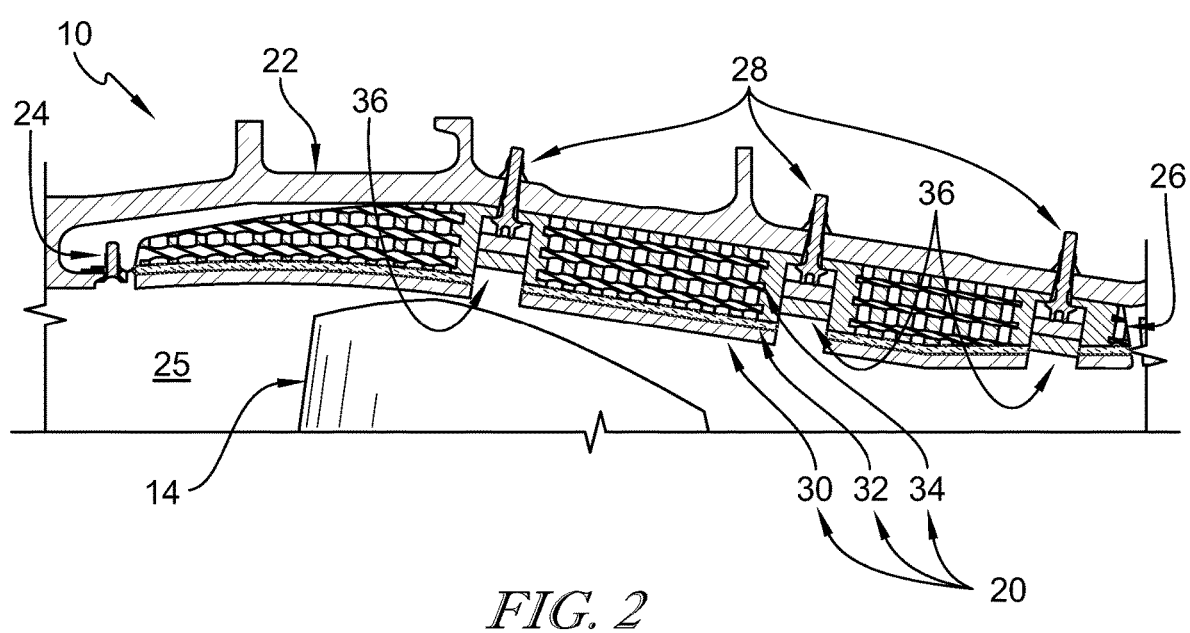
FIG. 2 is a cross-section view of the fan case assembly of the present disclosure and included in the gas turbine engine of FIG. 1 showing that the fan case assembly includes a fan track liner that extends circumferentially at least partway about a central axis of the gas turbine engine to define a gas path of the gas turbine engine and an annular case that supports the fan track liner at a radial position relative to the central axis, and suggesting the fan track liner comprises a core section that defines a triply periodic minimal surface geometry.

The fan 112 includes a fan rotor 12 and a fan case assembly 10 as shown in FIGS. 1 and 2. The fan rotor 12 has a number of fan blades 14 configured to rotate about the axis 11 and push air to create thrust and propel the gas turbine engine 110. The fan case assembly 10 extends circumferentially around the fan blades 14 of the fan rotor 12 such that the fan case assembly 10 is aligned axially with the fan blades 14 to block air being pushed by the fan blades 14 from passing over tips of the fan blades 14 and direct the air in the aft direction.

Figure 3:
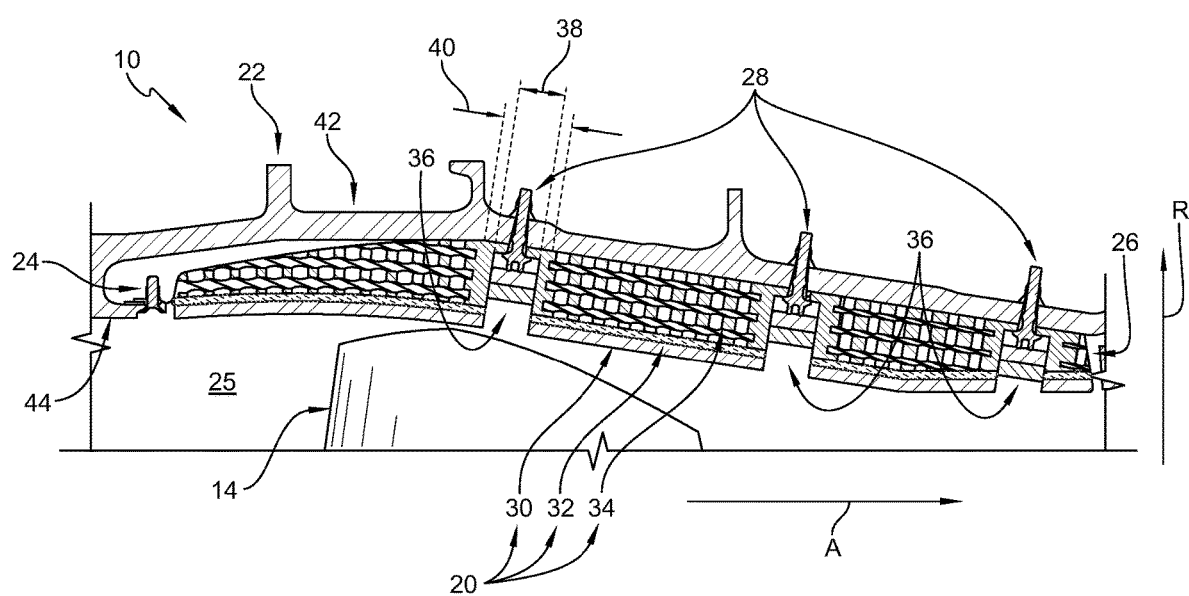
FIG. 3 is a view similar to FIG. 2 showing the fan track liner includes a radially innermost abradable section comprising an abradable material that extends between forward and the aft ends to define a portion of the gas path of the gas turbine engine, a septum section that comprises a composite material bonded to the abradable section radially outward of the abradable section, and the core section bonded to the septum section and configured to dissipate energy of a fan blade during a blade off event, and further suggesting the core section defines the triply periodic minimal surface geometry.
Figure 4:
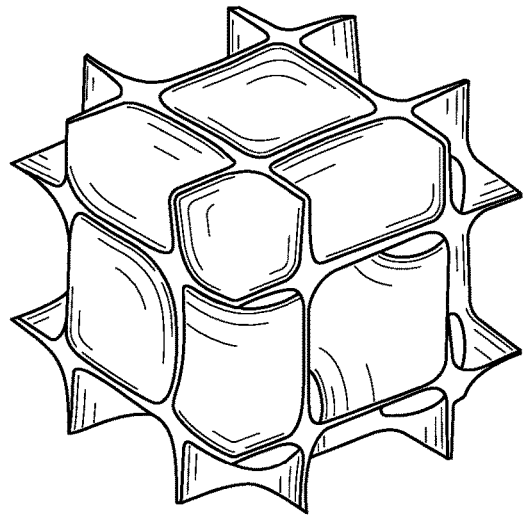
FIG. 4 is a perspective view of a diamond triply periodic minimal surface geometry used in the core section of an embodiment of a fan track liner of the present disclosure.
Figure 5:
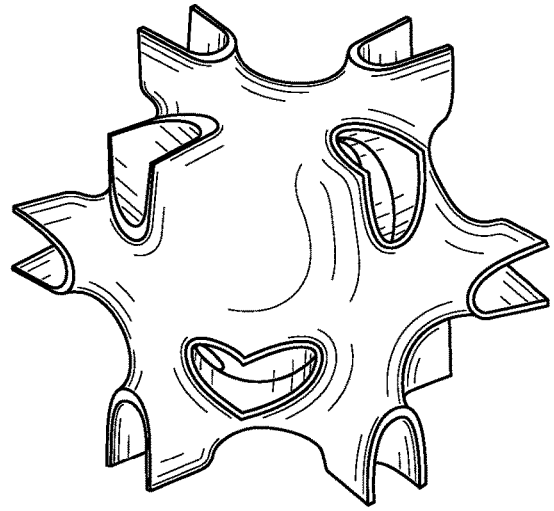
FIG. 5 is a perspective view of a neovius triply periodic minimal surface geometry used in the core section of an embodiment of a fan track liner of the present disclosure.
Figure 6:
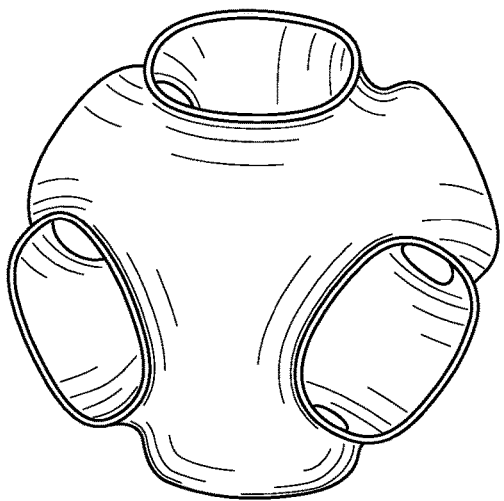
FIG. 6 is a perspective view of a primitive triply periodic minimal surface geometry used in the core section of an embodiment of a fan track liner of the present disclosure.
Figure 7:
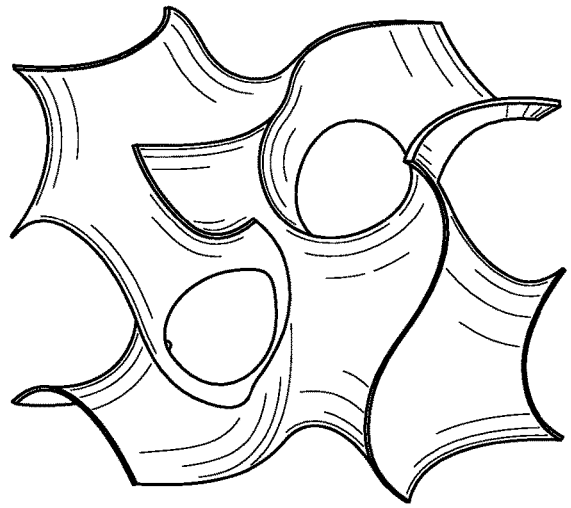
FIG. 7 is a perspective view of a gyroid triply periodic minimal surface geometry used in the core section of an embodiment of a fan track liner of the present disclosure.

The fan case assembly 10 includes, among other components, a fan track liner 20 and an annular case 22 as shown in FIGS. 2 and 3. The fan track liner 20 extends circumferentially at least partway about the axis 11 of the gas turbine engine 110. The fan track liner 20 extends axially between a forward end 24 and an aft end 26 spaced apart axially from the forward end 24. The annular case 22 is configured to support the fan track liner 20 at a radial position relative to the axis 11.

Fan track liners may be challenging components to design due to several competing constraints. The fan track liner may need to withstand (i) occasional blade tip rubs due to maneuver loading or running-in-handling during acceptance test, (ii) more severe blade rubs during fan blade impact with birds, and/or (iii) impacts from fan blade ice shedding events. The fan track liner may also need to form an accurate outer annulus line and provide room for a fan blade to sit/bed in during a fan blade off.

Additionally, the fan track liner may be used to contain the fan blade within the main containment region of the case during a fan blade off event. The fan track liner may therefore need to be able to absorb a portion of the fan blade's energy during fan blade off, while also being robust to the cyclic blade passing pressure fluctuations. The fan track liner may also be designed to be easily serviceable.

Some fan track liners may include a honeycomb core section, typically comprising aluminum material to help meet some of the constraints discussed above. The honeycomb geometry helps with absorbing the energy of the fan blade and containing the fan blade in the case. The honeycomb core section may need to be aligned largely perpendicular to the fan case to be able to effectively dissipate energy during a blade off event. Therefore, the fan track liner may be formed by multiple pieces of machined honeycomb, which can create gaps between the different pieces of the honeycomb structure.

The fan track liner 20 is formed to define an abradable section 30, a septum section 32, and a core section 34 as shown in FIGS. 2 and 3. The abradable section 30 extends between the forward end 24 and the aft end 26 to define a gas path 25 of the gas turbine engine 110. The septum section 32 is bonded to the abradable section 30 radially outward of the abradable section 30. The core section 34 is bonded to the septum section 32. The abradable section 30 comprises an abradable material and the septum section 32 comprises a composite material in the illustrative embodiment. The core section 34 is configured to dissipate energy of a fan blade during a blade off event.

The core section 34 of the fan track liner 20 replaces the honeycomb portion with a triply periodic minimal surface geometry. Examples of triply periodic minimal surface geometries are shown in FIGS. 4-7. The triply periodic minimal surface geometry of the core section 34 is configured to mitigate the energy of the fan blade during a blade off event by dissipating it through plastic deformation of the structure.

The triply periodic minimal surface geometry of the core section 34 may be formed using a 3D printing or additive manufacturing process to build up the core section 34. The triply periodic minimal surface geometries enable all of the powder from the 3D printing process to be removed as there is a continuous path for exit. The triply periodic minimal surface geometries may be 3D printed without supports. Moreover, the triply periodic minimal surface geometry enables the core section 34 to be a single piece and may make coupling the fan track liner 20 to the case 22 easier.

Further, the triply periodic minimal surface geometry and additive manufacturing process may allow the density of the fan track liner 20 to be varied so that the fan track liner 20 may be spatially tuned. The variable density may help mitigate the energy of the fan blade off by dissipating the energy through plastic deformation of the fan track liner 20. Unlike honeycomb geometries that have a uniform density from the inner diameter to the outer diameter of the fan track liner 20, the triply periodic minimal surface geometry is graded in illustrative embodiments so that the inner diameter may have a more open structure, i.e. a lower density, to allow the fan blade to enter the fan track liner 20 during blade off, while the outer diameter may have a less open structure, i.e. increases in density, to provide additional energy absorption prior to hitting the annular case 22.

In the illustrative embodiments, the triply periodic minimal surface geometry has a variable density that increases in at least one of a radially outward direction and an axially aft direction as shown in FIGS. 2 and 3. The density increases in the radially outward direction, as suggested by arrow R, and/or the axially aft direction, as suggested by arrow A, so that the fan blade 14 may move into the fan track liner 20 with relatively low resistance at the initial impact into the fan track liner 20 during a blade off event while the fan track liner 20 provides relatively high resistance moving radially outward and axially aft to provide additional energy absorption to keep the fan blade 14 captured in the fan track liner 20 after the initial impact. In other embodiments, the density of the triply periodic minimal surface geometry is relatively uniform throughout the core section 34.

The aft end 26 of the fan track liner 20 has triply periodic minimal surface geometry with a greater density as compared to the density of the triply periodic minimal surface geometry at the forward end 24. The greater density at this location may assist due to ice impact energies typically being higher towards the aft end 26 of the fan track liner 20. The forward end 24 may have triply periodic minimal surface geometry of a lower density compared to the aft end 26 to both reduce weight and ensure proper engagement of the fan blade 14 with the fan track liner 20 during the fan blade off event. The forward end 24 may have a substantially more open triply periodic minimal surface geometry compared to the aft end 26.

Figure 8:
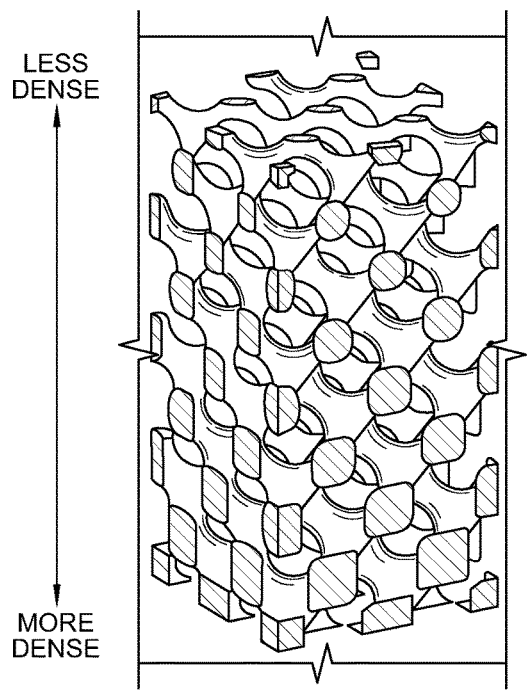
FIG. 8 is a perspective view of the core section of the fan track liner of FIG. 3 showing a triply periodic minimal surface geometry whereby the density of the triply periodic minimal surface is relatively graded.
Figure 9:
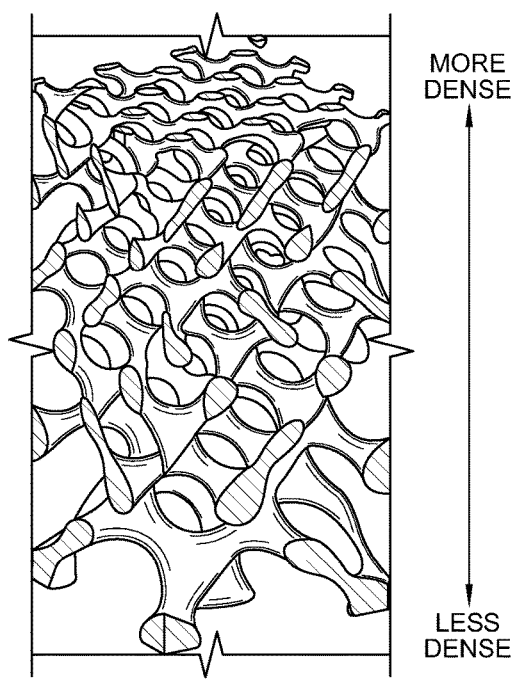
FIG. 9 is a perspective view of an embodiment of the core section of the fan track liner of FIG. 3 showing a triply periodic minimal surface geometry whereby the density of each cell size of the triply periodic minimal surface is graded.

The triply periodic minimal surface geometry of the fan track liner 20 may be any one of a diamond, neovius, primitive, and gyroid triply periodic minimal surface as shown in FIGS. 4-7. To adjust the density of the triply periodic minimal surface geometry, the density may be relatively graded or the density of each cell size of the triply periodic minimal surface may be graded as shown in FIGS. 8 and 9. In other embodiments, the triply periodic minimal surface geometry may transition between different lattices, like the different triply period minimal surface geometries shown in FIGS. 4-7, to alter the density of the fan track liner 20. In the illustrative embodiment, the core section 34 of the fan track liner 20 defines a plurality of unit cells that each include the triply periodic minimal surface geometry. The density of the plurality of unit cells increases moving in one of the radially outward direction and the axially aft direction.

Turning again to the fan case assembly 10, the fan case assembly 10 further includes a plurality of fasteners 28 as shown in FIGS. 2 and 3. The plurality of fasteners 28 each extend through the fan track liner 20 into the annular case 22 to couple the fan track liner 20 to the annular case 22.

Other fan case assemblies may use fasteners to couple the fan track liners made of honeycomb material to the fan case as opposed to bonding the fan track liner directly to the case. Bonding the fan track liner to the case may make it difficult to remove because the bond to the fan case is so strong and removing a damaged fan track liner may damage the fan case.

The fasteners may be used to couple the fan track liner made of honeycomb material to the fan case. The fasteners may extend through the honeycomb section of the fan track liner into internal hooks to mount the fan track liner to the fan case. In other embodiments, the fasteners may extend through the honeycomb section of the fan track liner and through the outer wall of the case.

While this may reduce cost of the fan case and improves the dynamics of the fan track liner, the honeycomb structure of the fan track liner may make bonding the washers to the fan track liner difficult. The filler/bonder may not bond properly depending on how the honeycomb is formed and which cell walls are breached. Further, the fan track liner may still need to be multiple pieces of honeycomb.

The triply periodic minimal surface geometry of the fan track liner 20 allows the density of the core section 34 to be increased around the fasteners 28 to improve engagement of the fasteners 28 with the fan track liner 20. The density of the triply periodic minimal surface geometry of the fan track liner 20 is greater around each of the fasteners 28 as shown in FIG. 3. The density of the triply periodic minimal surface geometry of the fan track liner 20 is greater at a first distance 40 around each of the plurality of fasteners 28 and lesser at a second distance greater than the first distance 40 around each of the plurality of fasteners 28.

The increased density around the plurality of fasteners 28 may help create a secure bond at each of the fastener connections. In the illustrative embodiment, the core section 34 of the fan track liner 20 includes a solid geometry arranged around each of the plurality of fasteners 28 as shown in FIGS. 2 and 3. The solid geometry has a greater density than the triply periodic minimal surface geometry so that the fan track liner 20 has an increased density at the first distance 40 around the plurality of fasteners 28.

In the illustrative embodiment, the fan track liner 20 includes through holes 36 that extend through the abradable section 30, the septum section 32, and the core section 34 of the fan track liner 20 as shown in FIGS. 2 and 3. Each fastener 28 of the plurality of fasteners 28 extends through one of the through holes 36 and into the annular case 22. The plurality of through holes 36 each have a diameter 38 and extend through the solid geometry areas of the core section 34 of the fan track liner 20 as shown in FIGS. 2 and 3.

The annular case 22 includes an outer wall 42 and a forward hook 44 as shown in FIGS. 2 and 3. The outer wall 42 extends circumferentially around the central axis 11 of the gas turbine engine 110. The forward hook 44 extends radially inward at a location axially forward of the forward end 24 of the fan track liner 20. The forward hook 44 also extends axially aft from the outer wall 42 and is coupled with the fan track liner 20 to support the forward end 24 of the fan track liner 20. The forward hook 44 is configured to help stop forward movement of the fan blade 14 during the fan blade off event after the initial impact.

Each fastener 28 of the plurality of fasteners 28 extends through one of the through holes 36 in the fan track liner 20 and into the outer wall 42 of the annular case 22 as shown in FIGS. 2 and 3. The fasteners 28 are spaced axially apart relative to the axis 11.

A method may include several steps. The method may include forming the core section 34 of the fan track liner 20 to define the triply periodic minimal surface geometry. The triply periodic minimal surface geometry may be formed by 3D printing or additive layer manufacturing the core section 34. The triply periodic minimal surface geometry may be formed so that the triply periodic minimal surface geometry has the variable density that increases in the radially outward direction R and/or the axially aft direction A.

Once the core section 34 is formed, the method continues with coupling the core section 34 of the fan track liner 20 to the septum section 32 and coupling the septum section 32 to the abradable section 30 to form the fan track liner 20. The order of which the different sections are coupled together may vary.

After the abradable section 30, the septum section 32, and the core section 34 are bonded together, the method includes coupling the fan track liner 20 to the annular case 22. Coupling the fan track liner 20 to the annular case 22 may include inserting the fasteners 28 into the through holes 36 in the fan track liner 20 and into the annular case 22.

In the illustrative embodiment, the fan track liner 20 is formed to define the abradable section 30, the septum section 32, and the core section 34 as shown in FIGS. 2 and 3. In some embodiments, the fan track liner 20 may be formed to define the abradable section 30 and the core section 34 bonded to the abradable section. In some embodiments, the fan track liner 20 only includes the core section 34.

Figure 10:
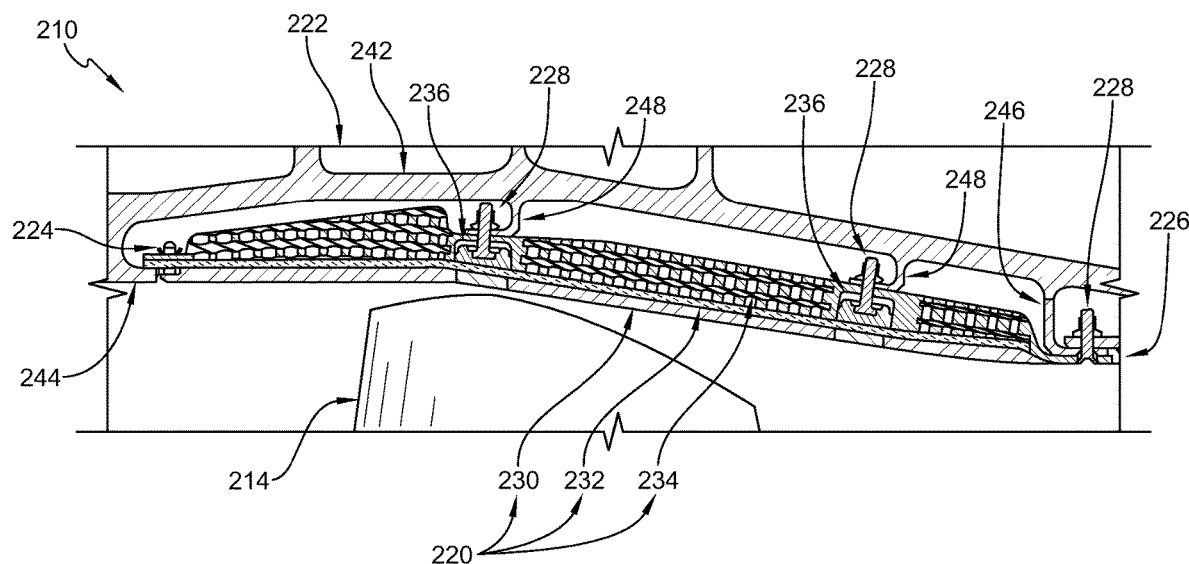
FIG. 10 is a cross-section view of another embodiment of a fan case assembly adapted for use in the gas turbine engine of FIG. 1 showing that the fan case assembly includes a fan track liner that extends circumferentially at least partway about a central axis of the gas turbine engine to define a gas path of the gas turbine engine, an annular case that supports the fan track liner at a radial position relative to the central axis, and a plurality of fasteners that extend through the fan track liner into one of a plurality of intermediate hooks included in the annular case, and further showing the fan track liner comprises a core section that defines a triply periodic minimal surface geometry.

Another embodiment of a fan case assembly 210 in accordance with the present disclosure is shown in FIG. 10. The fan case assembly 210 is substantially similar to the fan case assembly 10 shown in FIGS. 1-3 and described herein. Accordingly, similar reference numbers in the 200 series indicate features that are common between the fan case assembly 10 and the fan case assembly 210. The description of the fan case assembly 10 is incorporated by reference to apply to the fan case assembly 210, except in instances when it conflicts with the specific description and the drawings of the fan case assembly 210.

The fan case assembly 210 includes a fan track liner 220, an annular case 222, and a plurality of fasteners 228 as shown in FIG. 10. The fan track liner 220 extends circumferentially at least partway about the axis 11 of the gas turbine engine 110. The fan track liner 220 extends axially between a forward end 224 and an aft end 226 spaced apart axially from the forward end 224. The annular case 222 is configured to support the fan track liner 220 at a radial position relative to the axis 11. The plurality of fasteners 228 extend through the fan track liner 220 into the annular case 222 to couple the fan track liner 220 to the annular case 222.

The fan track liner 220 is formed to define an abradable section 230, a septum section 232, and a core section 234 as shown in FIG. 10. The septum section 232 is bonded to the abradable section 230 radially outward of the abradable section 230. The core section 234 bonded to the septum section 232. The abradable section 230 comprises an abradable material and the septum section 232 comprises a composite material. The core section 234 is configured to dissipate energy of a fan blade during a blade off event. The core section 234 comprises a triply periodic minimal surface geometry like as shown in FIGS. 4-7.

The triply periodic minimal surface geometry has a variable density that increases in at least one of a radially outward direction and an axially aft direction. The density increases in the radially outward direction and/or the axially aft direction so that the fan blade 214 may move into the fan track liner 220 with relatively low resistance at the initial impact into the fan track liner 220 during a blade off event while the fan track liner 220 provides relatively high resistance moving radially outward and axially aft to provide additional energy absorption to keep the fan blade 214 captured in the fan track liner 220 after the initial impact.

In the illustrative embodiment, the fan track liner 220 includes through holes 236 that extend through the abradable section 230, the septum section 232, and the core section 234 of the fan track liner 20 as shown in FIG. 10. Each fastener 228 of the plurality of fasteners 228 extends through one of the through holes 236 and into the annular case 222.

In the illustrative embodiment, the core section 234 of the fan track liner 220 includes a solid geometry arranged around each of the plurality of fasteners 228 as shown in FIG. 10. The solid geometry has a greater density than the triply periodic minimal surface geometry so that the fan track liner 220 has an increased density at the first distance around the plurality of fasteners 228. The plurality of through holes 236 extend through the solid geometry areas of the core section 234 of the fan track liner 220.

The annular case 222 includes an outer wall 242, a forward hook 244, an aft hook 246, and a plurality of intermediate hooks 248 as shown in FIG. 10. The outer wall 242 extends circumferentially around the central axis 11 of the gas turbine engine 110. The forward hook 244 extends radially inward at a location axially forward of the forward end 224 of the fan track liner 220. The aft hook 246 extends radially inward at a location axially aft of the aft end 226 of the fan track liner 220. The intermediate hooks 248 extend radially inward from the outer wall 242 axially between the forward and aft hooks 244, 246.

The forward hook 244 extends radially inward and axially aft from the outer wall 242 and is coupled with the fan track liner 220 to support the forward end 224 of the fan track liner 220. The aft hook 246 extends radially inward and axially aft from the outer wall 242 and is coupled with the fan track liner 220 to support the aft end 226 of the fan track liner 220. The intermediate hooks 248 extend radially inward and axially forward from the outer wall 242 and are coupled with the fan track liner 220 to support the fan track liner 220 axially between the forward and aft ends 224, 226.

Each fastener 228 of the plurality of fasteners 228 extends through one of the through holes 236 and into one intermediate hook 248 of the annular case 222 as shown in FIG. 10. Unlike the fasteners 28 in FIGS. 2 and 3, the fasteners 228 extend into the intermediate hooks 248 instead of the outer wall 242.

Figure 11:
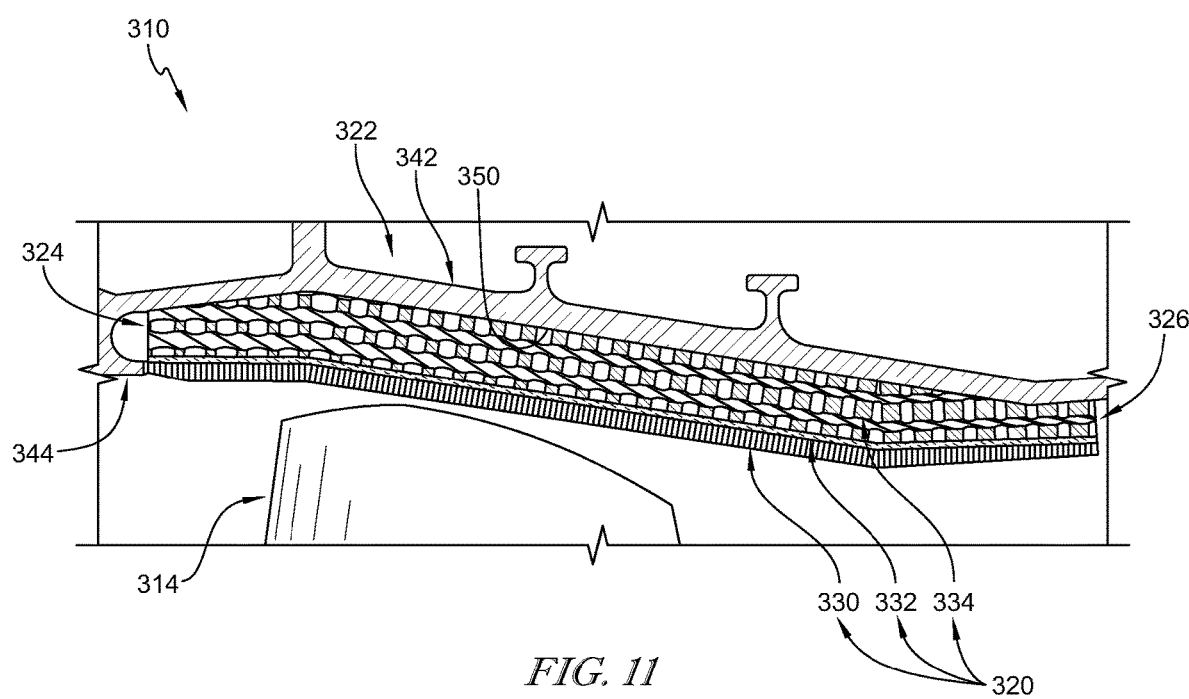
FIG. 11 is a cross-section view of another embodiment of a fan case assembly adapted for use in the gas turbine engine of FIG. 1 showing that the fan case assembly includes a fan track liner that extends circumferentially at least partway about a central axis of the gas turbine engine to define a gas path of the gas turbine engine and an annular case that supports the fan track liner at a radial position relative to the central axis, and further showing the fan track liner comprises a core section that defines a triply periodic minimal surface geometry and that is adhered directly to the annular case.

Another embodiment of a fan case assembly 310 in accordance with the present disclosure is shown in FIG. 11. The fan case assembly 310 is substantially similar to the fan case assembly 10 shown in FIGS. 1-3 and described herein. Accordingly, similar reference numbers in the 300 series indicate features that are common between the fan case assembly 10 and the fan case assembly 310. The description of the fan case assembly 10 is incorporated by reference to apply to the fan case assembly 310, except in instances when it conflicts with the specific description and the drawings of the fan case assembly 310.

The fan case assembly 310 includes a fan track liner 320 and an annular case 322 as shown in FIG. 11. The fan track liner 320 extends circumferentially at least partway about the axis 11 of the gas turbine engine 110. The fan track liner 320 extends axially between a forward end 324 and an aft end 326 spaced apart axially from the forward end 324. The annular case 322 is configured to support the fan track liner 320 at a radial position relative to the axis 11. In the illustrative embodiment, the fan track liner 320 is bonded to an inner surface 350 of the annular case 322 instead of using fasteners that extend through the fan track liner 320.

The fan track liner 320 is formed to define an abradable section 330, a septum section 332, and a core section 334 as shown in FIG. 11. The septum section 332 is bonded to the abradable section 330 radially outward of the abradable section 330. The core section 334 bonded to the septum section 332 radially outward of the septum section 332.

The abradable section 330 comprises an abradable material and the septum section 332 comprises a composite material. The core section 334 is configured to dissipate energy of a fan blade during a blade off event. The core section 334 comprises a triply periodic minimal surface geometry like as shown in FIGS. 4-7.

The triply periodic minimal surface geometry has a variable density that increases in at least one of a radially outward direction and an axially aft direction. The density increases in the radially outward direction and/or the axially aft direction so that the fan blade 314 may move into the fan track liner 320 with relatively low resistance at the initial impact into the fan track liner 320 during a blade off event while the fan track liner 320 provides relatively high resistance moving radially outward and axially aft to provide additional energy absorption to keep the fan blade 314 captured in the fan track liner 320 after the initial impact.

In the illustrative embodiment, the core section 334 is bonded to the inner surface 350 of the annular case 322 so that the fan track liner 320 is coupled to the annular case 322. Other honeycomb fan track liners may also be bonded to the fan case to couple the fan track liner to the case. However, the open structure of the honeycomb geometry of these fan track liners at the outer surface of the fan track liner may make bonding the fan track liner to the case difficult. The openings may also allow water ingress into the honeycomb structure which has the potential for dis-bonds between the honeycomb fan track liner and the fan case.

The outer surface of the fan track liner 320 has triply periodic minimal surface geometry with a greater density as compared to the density of the triply periodic minimal surface geometry at the inner surface of the fan track liner 320 such that the outer surface of the fan track liner 320 may form a solid wall or geometry. The solid wall may make it easier to bond the fan track liner 320 to the annular case 322.

The annular case 322 includes an outer wall 342 and a forward hook 344 as shown in FIG. 11. The outer wall 342 extends circumferentially around the central axis 11 of the gas turbine engine 110. The forward hook 344 extends radially inward at a location axially forward of the forward end 324 of the fan track liner 320. The forward hook 344 extends radially inward and axially aft from the outer wall 342.

The core section 334 is bonded to the outer wall 342 of the annular case 322. The forward hook 344 is configured to help stop forward movement of the fan blade during the fan blade off event after the initial impact. The fan blade gets trapped by the fan track liner 320 and the forward hook 344 after the initial impact.

Figure 12:
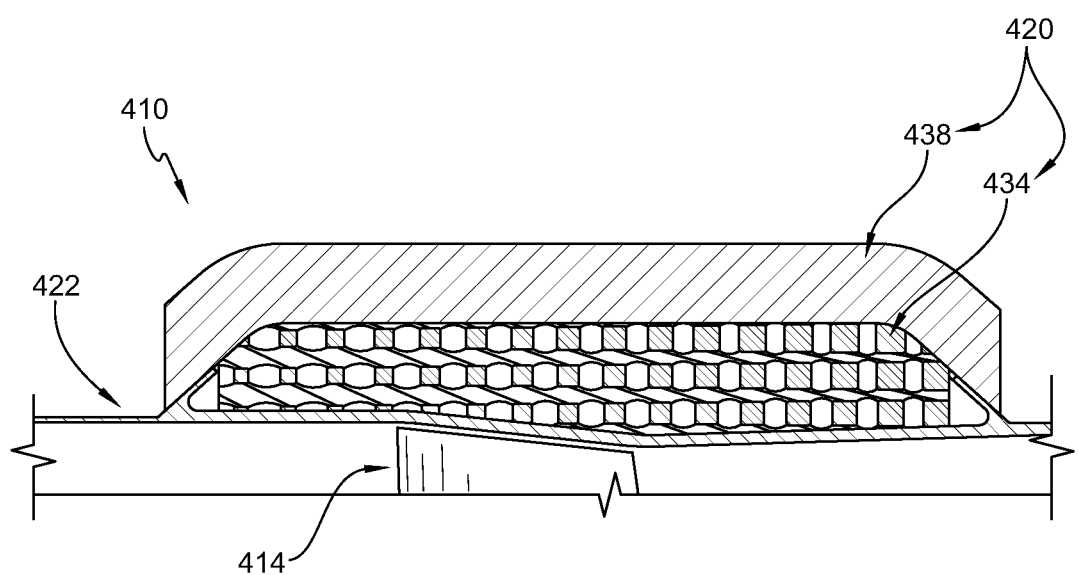
FIG. 12 is a cross-section view of another embodiment of a fan case assembly adapted for use in the gas turbine engine of FIG. 1 showing that the fan case assembly includes an annular case that extends circumferentially at least partway about a central axis of the gas turbine engine to define a gas path of the gas turbine engine and a fan track liner coupled to the annular case radially outward of the annular case, and further showing the fan track liner comprises a core section that defines a triply periodic minimal surface geometry.

Another embodiment of a fan case assembly 410 in accordance with the present disclosure is shown in FIG. 12. The fan case assembly 410 is substantially similar to the fan case assembly 10 shown in FIGS. 1-3 and described herein. Accordingly, similar reference numbers in the 400 series indicate features that are common between the fan case assembly 10 and the fan case assembly 410. The description of the fan case assembly 10 is incorporated by reference to apply to the fan case assembly 410, except in instances when it conflicts with the specific description and the drawings of the fan case assembly 410.

The fan case assembly 410 includes a fan track liner 420 and an annular case 422 as shown in FIG. 11. The fan track liner 420 and the annular case 422 each extend circumferentially at least partway about the axis 11 of the gas turbine engine 110. Unlike the fan case assemblies 10, 210, 310, the annular case 422 defines the gas path 25 of the gas turbine engine 110, while the fan track liner 420 is coupled to the annular case 422 radially outward of the annular case 422.

The fan track liner 420 is formed to define a core section 434 and an outer section 438 as shown in FIG. 12. The core section 434 bonded to the annular case 422. The outer section 438 is arranged radially outward of the core section 434.

The outer section 438 is made of a synthetic fiber material, such as Kevlar®. The core section 434 comprises a triply periodic minimal surface geometry like as shown in FIGS. 4-7.

The triply periodic minimal surface geometry of the core section 434 has a variable density that increases in at least one of a radially outward direction and an axially aft direction as shown in FIG. 12. The density increases in the radially outward direction and/or the axially aft direction so that the fan blade 414 may move into the fan track liner 420 with relatively low resistance at the initial impact into the fan track liner 420 during a blade off event while the fan track liner 420 provides relatively high resistance moving radially outward and axially aft to provide additional energy absorption to keep the fan blade 414 captured in the fan track liner 420 after the initial impact.

The grading of the density of the fan track liner 20, 220, 320, 420 allows the fan track liner 20, 220, 320, 420 to be spatially tuned. For example, in the areas where fasteners 28, 228 are to be installed the fan track liner 20, 220 may morph to a solid wall or a solid geometry, enabling a secure bond and then transitioning away to a more open structure with a lower density for reduced weight. The aft end 26, 226, 326 of the fan track liner 20, 220, 320 may utilize a higher cell density since ice impact energies are higher at the aft end 26, 226, 326 of the fan track liner 20, 220, 320, while the forward end 24, 224, 324 may be substantially more open or less dense to both reduce weight and ensure proper engagement of the fan blade 14, 214, 314 with the fan case assembly 10, 210, 310 during a fan blade off event.

Potential modal issues may be addressed via localized changes to increase or decrease stiffness in the fan track liner 20, 220, 320. The triply periodic minimal surface geometry may also assist in mitigating the energy of the fan blade off by dissipating it through plastic deformation of the structure. In particular this is an advantage over honeycomb since the honeycomb has uniform density from the inner diameter to the outer diameter of the fan track liner 20, 220, 320.

The density of the triply periodic minimal surface geometry may be graded so that the inner diameter may have a more open structure, or a lower density, to allow the fan blade to enter the fan track liner 20, 220, 320 during blade off, while the outer diameter increases in density to provide additional energy absorption prior to hitting the annular case 22, 222, 322. The graded triply periodic minimal surface geometry may transition to a solid/flat surface at the outer surface to prevent water ingress. There may be challenges with water ingress into the honeycomb structure that has the potential for dis-bonds between the honeycomb and the case. Utilizing a triply periodic minimal surface structure that transitions to a solid wall could prevent the ingress issues.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising
a fan track liner that extends circumferentially at least partway about a central axis of the gas turbine engine and axially between a forward end and an aft end spaced apart axially from the forward end, the fan track liner includes an abradable section comprising an abradable material that extends between the forward end and the aft end to define a gas path of the gas turbine engine, a septum section that comprises a composite material and is bonded to the abradable section radially outward of the abradable section, and a core section bonded to the septum section and configured to dissipate energy of a fan blade during a blade off event, and an annular case configured to support the fan track liner at a radial position relative to the central axis, the annular case including an outer wall that extends circumferentially around the central axis of the gas turbine engine and a hook that extends radially inward and axially aft from the outer wall, wherein the core section of the fan track liner comprises a triply periodic minimal surface geometry having a variable density that increases in at least one of a radially outward direction and an axially aft direction so that the initial impact of the fan blade with the fan track liner during the blade off event allows the fan blade to move into the fan track liner with relatively low resistance while the fan track liner provides relative high resistance as the fan blade moves radially outward to provide additional energy absorption to capture the fan blade in the fan track liner after the initial impact.

2. The fan case assembly of claim 1, wherein the density of the triply periodic minimal surface geometry increases in both the radially outward direction and the axially aft direction.

3. The fan case assembly of claim 2, further comprising a plurality of fasteners that extend through the fan track liner into the annular case to couple the fan track liner to the annular case, wherein the core section of the fan track liner includes solid geometry arranged around each of the plurality of fasteners.

4. The fan case assembly of claim 2, wherein the triply periodic minimal surface is one of a diamond, neovius, primitive, and gyroid triply periodic minimal surface.

5. The fan case assembly of claim 1, further comprising a plurality of fasteners that extend through the fan track liner into the annular case to couple the fan track liner to the annular case, and wherein the density of the triply periodic minimal surface geometry is greater at a first distance around each of the plurality of fasteners and lesser at a second distance around each of the plurality of fasteners, the second distance being greater than the first distance.

6. The fan case assembly of claim 5, wherein the fan track liner further includes through holes that extend through the fan track liner, each fastener of the plurality of fasteners extends through one of the through holes and into the annular case, and the core section of the fan track liner has a solid geometry around the plurality of fasteners.

7. The fan case assembly of claim 6, wherein the annular case further includes an intermediate hook that extends radially inward from the outer wall, each fastener of the plurality of fasteners extends through one of the through holes and into the intermediate hook of the annular case.

8. The fan case assembly of claim 1, wherein the core section of the fan track liner defines a plurality of unit cells that each include the triply periodic minimal surface geometry and the density of the plurality of unit cells increases moving in one of the radially outward direction and the axially aft direction.

9. A fan case assembly adapted for use with a gas turbine engine, the fan case assembly comprising a fan case that extends circumferentially about an axis, and a fan track liner that extends circumferentially at least partway about the axis and coupled with the fan case, the fan track liner including an abradable section and a core section located radially outward of the abradable section, wherein the core section defines a triply periodic minimal surface geometry, wherein the triply periodic minimal surface geometry has a variable density that increases in at least one of a radially outward direction and an axially aft direction.

10. The fan case assembly of claim 9, wherein the density of the triply periodic minimal surface geometry increases in both the radially outward direction and the axially aft direction.

11. The fan case assembly of claim 9, further comprising a plurality of fasteners that extend through the fan track liner into the fan case to couple the fan track liner to the fan case, wherein the core section of the fan track liner includes solid geometry arranged around each of the plurality of fasteners.

12. The fan case assembly of claim 9, wherein the triply periodic minimal surface is one of a diamond, neovius, primitive, and gyroid triply periodic minimal surface.

13. The fan case assembly of claim 9, further comprising a plurality of fasteners that extend through the fan track liner into the fan case to couple the fan track liner to the fan case, and wherein the density of the triply periodic minimal surface geometry is greater at a first distance around each of the plurality of fasteners and lesser at a second distance around each of the plurality of fasteners, the second distance being greater than the first distance.

14. The fan case assembly of claim 13, wherein the fan track liner further includes through holes that extend through the fan track liner, each fastener of the plurality of fasteners extends through one of the through holes and into the fan case, and the core section of the fan track liner has a solid geometry around the plurality of fasteners.

15. The fan case assembly of claim 13, wherein the fan case includes an outer wall that extends circumferentially around the central axis of the gas turbine engine, a forward hook that extends radially inward and axially aft from the outer wall, and an intermediate hook that extends radially inward from the outer wall, each fastener of the plurality of fasteners extends through one of the through holes and into the intermediate hook of the fan case.

16. The fan case assembly of claim 9, wherein the fan track liner defines a plurality of unit cells that each include the triply periodic minimal surface geometry and the density of the plurality of unit cells increases moving in one of the radially outward direction and the axially aft direction.

17. A method comprising forming a core section to define a triply periodic minimal surface geometry having a variable density that increases in at least one of a radially outward direction and an axially aft direction, the core section extending circumferentially at least partway about an axis and axially between a forward end and an aft end spaced apart axially from the forward end, adding an abradable section on the core section radially inward of the core section to form a fan track liner, the abradable section comprising an abradable material, and coupling the fan track liner to an annular case that extends circumferentially at least partway about the axis.

18. The method of claim 17, wherein coupling the fan track liner to the annular case includes inserting a plurality of fasteners through the fan track liner into the annular case.

19. The method of claim 18, wherein the density of the triply periodic minimal surface geometry is greater at a first distance around each of the plurality of fasteners and lesser at a second distance around each of the plurality of fasteners, the second distance being greater than the first distance.

* * * * *